United States Patent [19]

Lundin

[11] Patent Number: 4,542,555

[45] Date of Patent: Sep. 24, 1985

[54] DEVICE FOR CLEANING A COLLECTING ROPE FROM OIL OR SIMILAR MATERIAL

[75] Inventor: Lars Lundin, Porvoo, Finland

[73] Assignee: Oy Lars Ludin Patent Ab, Helsinki, Finland

[21] Appl. No.: 597,758

[22] Filed: Apr. 6, 1984

[30] Foreign Application Priority Data

Apr. 7, 1983 [FI] Finland ................................. 831179

[51] Int. Cl.⁴ ............................................ E02B 15/04
[52] U.S. Cl. ........................................ 15/256.6; 15/1; 15/236 R
[58] Field of Search ............. 15/256.6, 104.04, 236 R, 15/1, 3; 134/9; 210/242.3, 924; 30/301

[56] References Cited

U.S. PATENT DOCUMENTS 4,220,481  9/1980  Bleiman ........................... 15/104.04
4,349,439  9/1982  Lundin ............................ 210/242.3

FOREIGN PATENT DOCUMENTS 858832  1/1961  United Kingdom .............. 15/256.6

Primary Examiner—Edward L. Roberts
Attorney, Agent, or Firm—Pennie & Edmonds

[57] ABSTRACT

The invention relates to a device for the cleaning of a collecting rope of oil or similar material. The device consists of a frame which is positioned around the rope and which has or to which there are connected tongues. The tongues are pressed or, by the effect of an external force, can be pressed towards the core of the rope, whereby the tongues wipe the oil or similar material off the rope as the rope passes through the device.

12 Claims, 8 Drawing Figures

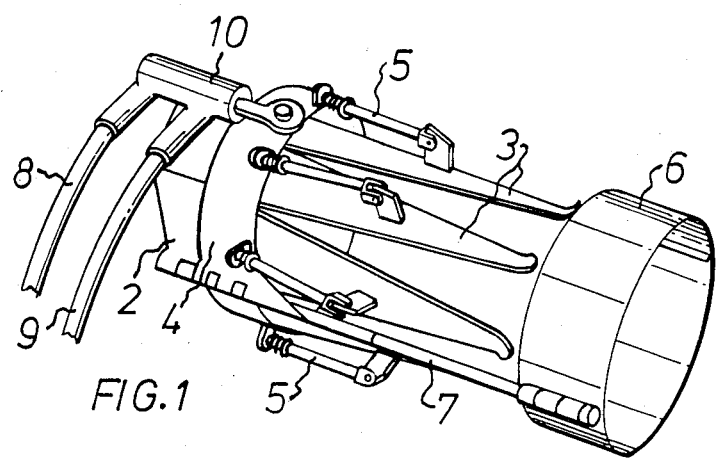
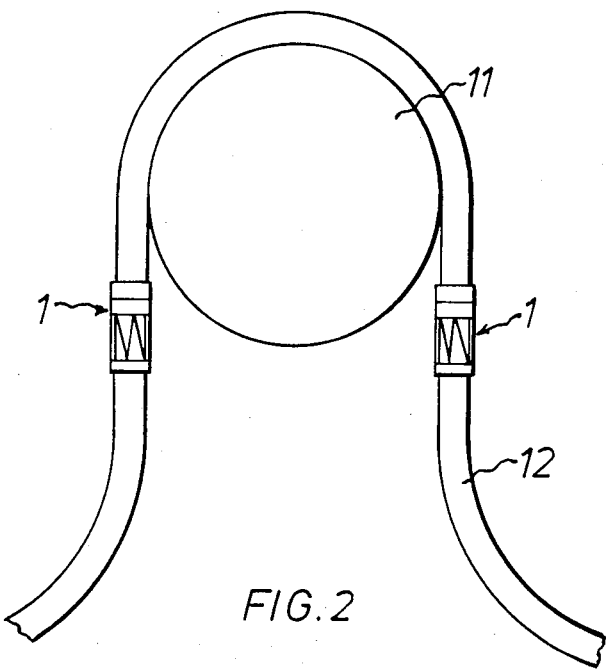

U.S. Patent Sep. 24, 1985 Sheet 3 of 3 4,542,555
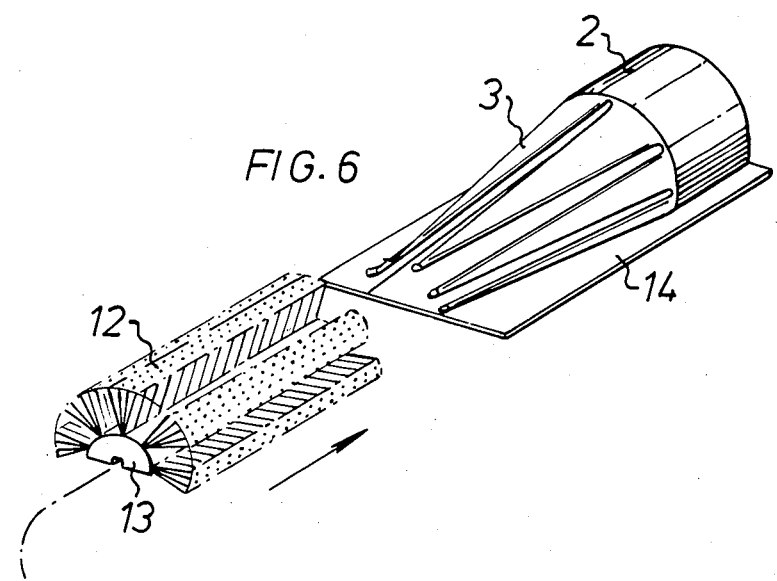
FIG. 6
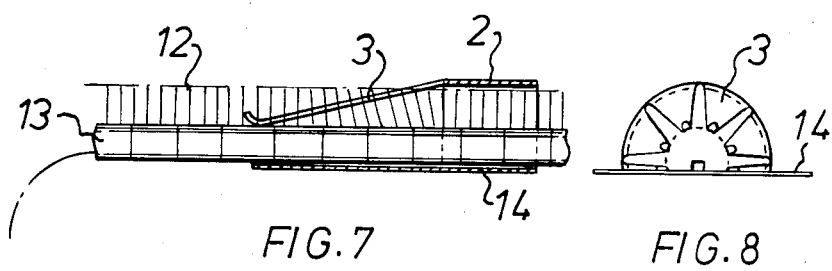 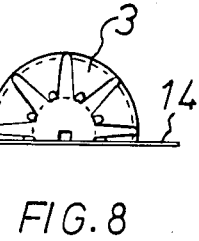
FIG. 7  FIG. 8

DEVICE FOR CLEANING A COLLECTING ROPE FROM OIL OR SIMILAR MATERIAL

BACKGROUND OF THE INVENTION

1. Field of the Invention

The present invention relates to a device by means of which a collecting rope can be cleaned of oil or other similar material. The invention relates in particular to an apparatus for cleaning a collecting rope having a bristle-like surface with grooves running in the longitudinal direction of the rope.

2. Description of the Prior Art

There are known several methods and systems for collecting oil spilled on water. One practicable method is to cause the oil on the water surface to be adsorbed to a rope which is moved reciprocatingly, and then to remove the oil from the rope. U.S. Pat. No. 4,349,439 presents a system for collecting oil or other similar material from the surface of water. In this known system the oil is removed from the collecting rope by means of wipers. These wipers consist of two trough-like parts which can be caused to approach each other in such a way that they adapt substantially tightly to the surface of the collecting rope and wipe the oil off it. Nevertheless, these wipers are not in all respects satisfactory. This is due to the fact that it is necessary to avoid excessive pressure in order not to damage the rope, but when less pressure is used the oil-removing capacity of the wipers decreases.

SUMMARY OF THE INVENTION

The object of the present invention is to provide a device which cleans a collecting rope effectively of oil or similar material without damaging the rope.

In order to achieve this object, the invention provides a device, which comprises: a frame part enclosing said rope, the shape of the frame part corresponding to the circular or semicircular cross section of the rope, and elongated tongues arranged along the periphery of said frame part and being equally distributed therealong, and extending gently inwardly slanted against the core part of the rope to be cleaned.

BRIEF DESCRIPTION OF THE DRAWINGS

FIG. 1 is a perspective representation of a cleaning device according to the invention, FIG. 2 is a schematic illustration of the positioning of the cleaning device according to the invention in an oil-collecting system, FIG. 6 depicts an embodiment of the invention providing a collecting rope of semicircular cross section, FIG. 7 depicts a sectional side view relating to FIG. 6, and FIG. 8 is an end view of the cleaning device according to FIG. 6.

DESCRIPTION OF THE PREFERRED EMBODIMENTS

Figure 3:
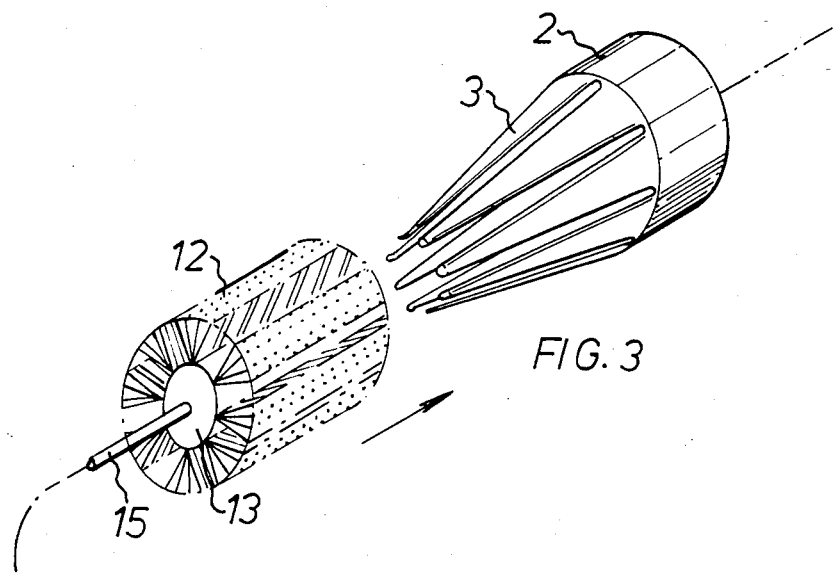
FIG. 3 depicts one embodiment of the invention, providing a collecting rope of circular cross section.

The device according to the invention consists of a frame 2 to the positioned around the rope. The device also includes tongues 3, a collar 4, and a rope guide 6. The tongues 3 are hinged or fastened by some other conventional method to the frame 2, or alternatively the tongues 3 are part of the frame 2. The collar 4 is preferably cylindrical, and it is connected to each tongue 3 by means of an arm 5. One end of each arm 5 is forked, and each tongue 3 has a vertical part which fits such a fork. The arms 5 and the tongues 3 are connected to each other by means of, for example, bolts. The collar 4 has radially extending pins having holes for the other ends of the arms 5. The arms 5 are secured to these pins by means of, for example, nuts screwed at the ends of the arms 5. At the last-mentioned attachment points there may also be springs fitted around the arms 5. These springs allow the tongues 3 to move somewhat upwards when they have been pressed into the working position, which for its part may prevent the rope from breaking. It is, of course evident that the arms 5 can be secured to the collar 4 and to the tongues 3 by using securing methods other than those described above.

The collar 4 can be moved reciprocatingly in the longitudinal direction along the longitudinal axis of the rope by an external force, for example, hydraulically, in which case the movement of the collar 4 is transmitted to the tongues 3 by the arms 5. When the collar 4 moves against the arrival direction of the rope, all the tongues 3 press simultaneously from different sides of the rope towards the core of the rope. Thereby the tongues 3 very effectively wipe the oil off the rope.

In the embodiment according to FIG. 1, the tongues 3 are movable with a hydraulic cylinder 10 having its piston shaft connected to the collar 4. Reference numbers 8 and 9 indicate connection lines for the hydraulic cylinder.

The shape and the number of the tongues 3 depend on the rope which is used at each given time. It is, however, advantageous for the tongues 3 to converge towards the arrival direction of the rope and for the tips of the tongues 3 to be bent upwards in relation to the rope. The device according to the invention is used advantageously for the cleaning of collecting ropes which have a bristle-like surface. Such ropes have been described in, for example, EPO patent aoplication No. 82303192.7. The device according to the invention is especially usable for the cleaning of ropes with a bristle-like surface in which the bristles form, between them, grooves running in the longitudinal direction of the rope. In this preferred embodiment of the invention the tongues 3 in their working position press into the said grooves, and the rope is thereby cleaned very effectively.

According to a preferred embodiment of the invention the device consists of two parts one on top of the other, the parts allowing the device to be opened and closed. Thus the rope can be easily installed in the device and removed from it. The parts are advantageously interconnected by means of a shaft 7, and in such a case the upper part can be turned, supported by the shaft 7.

FIG. 2 depicts an example of how the cleaning devices according to the invention can be placed in a collecting system used for combatting an oil spill. The cleaning devices according to the invention are indicated by reference numeral 1. The pulley 11, which is included in a collecting device secured to, for example, the aft of a boat, advances the rope 12 in the desired direction at the desired speed. The operations of the pulley 11 and the cleaning devices 1 are preferably linked to each other in such a way that a reversal of the rotating direction of the pulley 11 automatically causes only that device which is on the rope-arrival side to work. This means that the tongues of the cleaning device 1 on the arrival side of the rope 12 are in the working position, i.e. pressed towards the core of the rope 12, whereas the tongues of the cleaning device 1 on the other side of the pulley 11 are in the raised position. The functions of both the cleaning devices 1 and the pulley 11 are preferably hydraulic. The oil flowing from the cleaning devices 1 is collected in a receptacle from which the oil is, when desired, pumped into a tank.

Figure 4:
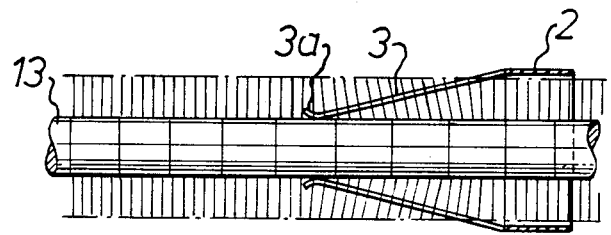
FIG. 4 depicts a sectional side view relating to FIG. 3.
Figure 5:
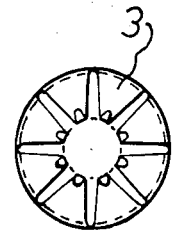
FIG. 5 is an end view of the cleaning device according to FIG. 3.

The FIGS. 3 to 5 depict more clearly the geometry of the cleaning device with respect to the collection rope to be cleaned. The tongues 3 are attached directly to the frame 2, the direction movement of the rope 12 being shown with an arrow. As shown, the angle of inclination of the tongues is considerably small, e.g. in the order of 10° to 20°, and the tips 3a of the tongues are bent outwards from the rope core 13 which also constitutes the floating piece of the rope. Also, it is essential that the periphery formed by the base parts of the tongues has a diameter corresponding to the outer diameter of the rope 12. Inside the rope is a pulling means 15, e.g. a chain.

The rope can also be of semicircular cross section, e.g. in the case where a plurality of rope loops have been arranged in parallel so as to constitute a wide mat. This situation is shown in FIGS. 6 and 7. The cleaning device with its tongues 3 is similar to that of FIGS. 3 to 5, except that it comprises only a semi-circle defined by a plane sheet 14 along which the smooth side of the rope core 13 will glide.

As mentioned before, the distance between the tongues is suitable the same as the distance between the bristles in the rope 12 so that the tongues are pressed in between the bristles and the cleaning effect is optimized. There is no hindrance to this even if in some cases the rope may be brought to rotate, as is disclosed e.g. in U.S. Pat. No. 4,349,439, since the rope may be constituted of a plurality of short pieces, as disclosed in EPO patent application No. 82303192.7, whereby the pieces can rotate resiliently in relation to each other on the pulling chain 15. Furthermore, the rate of rotation of the rope in such case is very low in relation to the longitudinal velocity.

What is claimed is:

1. A cleaning device for cleaning a collecting rope to be transported through the device, of oil and similar material, the collecting rope including a core and collecting bristles attached thereto, and said cleaning device comprising
    a frame part enclosing said rope, the shape of the frame part corresponding to the at least partly circular outer cross section of the rope as constituted by the outer ends of the bristles, and
    elongated spaced tongues having base parts arranged along the periphery of said frame part and being distributed therealong, and having free tips extending gently inwardly slanted against the direction of the rope transportation and through said bristles and against the core part of the rope to be cleaned, the spaces between said tongues narrowing as seen from the tips of the tongues and essentially closing at the base parts thereof.

2. A cleaning device according to claim 1, wherein the angle of inclination of the tongues is of the order of 10 to 20 degrees.

3. A cleaning device for cleaning a collecting rope of oil and similar material, said cleaning device comprising
    a frame part enclosing said rope, the shape of the frame part corresponding to the cross-section of the rope, elongated tongues arranged along the periphery of said frame part and being equally distributed therealong, and extending gently inwardly slanted against the core part of the rope to be cleaned and
    a guide part provided in front of the frame part in order to guide the rope into the cleaning device concentrically in relation to the tongues.

4. A device according to any one of claims 1-3, wherein the tips of the tongues are bent upwards.

5. A cleaning device according to any one of claims 1-3, wherein the tongues are pivotally mounted on the frame part and the device includes power means for moving the tongues inwardly and outwardly with respect to the rope.

6. A device according to claim 5, wherein the means for pressing the tongues towards the core of the rope comprises a hydraulically driven collar around the rope, the movement of the collar being transmitted to the tongues.

7. A device according to claim 6, wherein the collar is connected to each tongue by means of an arm, the arms transmitting the movement of the collar to each tongue.

8. A device according to any one of claims 1-3, wherein said device is made up of two parts interconnected by means of a shaft so that they can turn, thus enabling the device to be opened for fitting the rope in or for removing it.

9. A device according to claim 6 wherein the collar is mounted for movement axially of the rope to be transported through the device and the device further includes a plurality of arms each extending axially of said rope and having one end connected to the collar and the other end pivotally connected to a tongue.

10. A cleaning device for cleaning a collecting rope of oil and similar material, said cleaning device comprising
    a frame part enclosing said rope, the shape of the frame part corresponding to the cross-section of the rope, a plurality of elongated tapered tongues distributed about the periphery of said frame part and extending and tapering in a direction radially inwardly against the rope to be cleaned and means for resilient pressing the tongues radially inwardly against the rope as the rope is drawn through the device in a direction opposite the taper.

11. A cleaning device according to claim 10 wherein the rope is constructed of bristles extending radially outwardly from the longitudinal axis of the rope, and the elongated tongues are pressed into the bristles.

12. A device according to claim 10 wherein the rope is constructed of a central core and bristles extending radially outwardly from the core with the bristles forming, between them, circumferentially spaced longitudinally extending grooves, and
    the tongues are equal in number and circumferential spacing to the grooves for pressing into the grooves as the rope is drawn through the device.

* * * * *